April 2, 1940. E. C. HILL 2,195,778
HYDRAULIC CLUTCH OR TRANSMISSION
Filed June 21, 1938
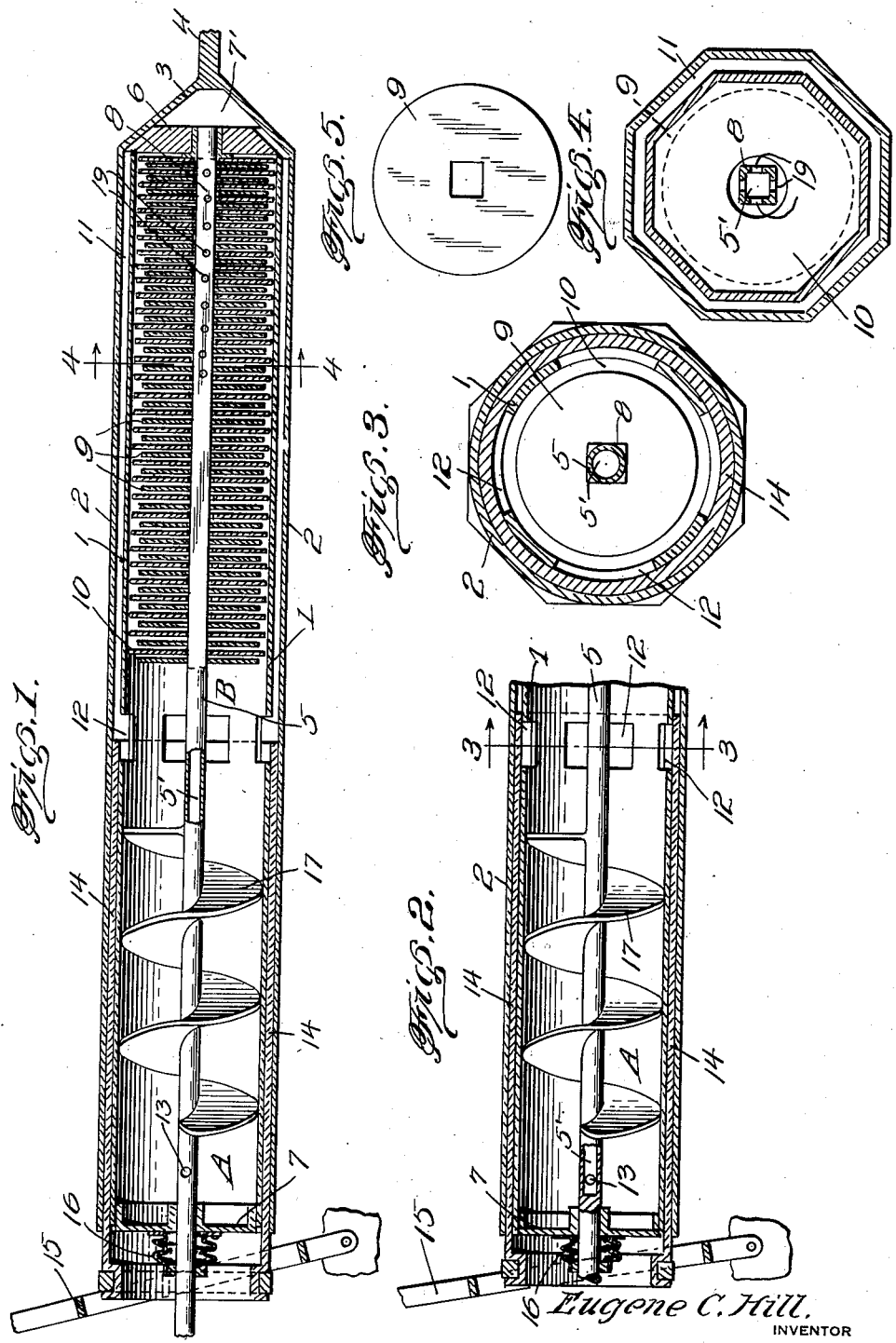
Eugene C. Hill,
INVENTOR
BY Victor J. Evans & Co.
ATTORNEYS Patented Apr. 2, 1940

2,195,778

UNITED STATES PATENT OFFICE 2,195,778

HYDRAULIC CLUTCH OR TRANSMISSION

Eugene C. Hill, McNeal, Ariz.

Application June 21, 1938, Serial No. 214,985

14 Claims. (Cl. 192—85)

This invention relates to hydraulic clutches or transmissions to be employed between drive and driven shafts and may be successfully used on motor vehicles and like devices and has for the primary object the provision of an efficient and inexpensive device of this character which will permit declutching of drive and driven shafts whenever desired and will provide a variable drive between the drive and driven shafts to compensate for varying loads.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a hydraulic clutch constructed in accordance with my invention.

Figure 2 is a fragmentary vertical sectional view illustrating a control valve moved in a position to close bypass ports of the clutch.

Figure 3 is a transverse sectional view taken on line 3—3 of Figure 2.

Figure 4 is a transverse sectional view taken on line 4—4 of Figure 1.

Figure 5 is a plan view illustrating one of the clutch plates.

Referring in detail to the drawing, the numerals 1 and 2 indicate inner and outer cylinders. The inner cylinder is spaced from the outer cylinder and joined thereto by a head 3 forming a closure for one end of both cylinders. The head 3 is secured to a driven shaft 4 and extending into the inner cylinder from the opposite end thereof from the head 3 is a drive shaft 5, one end of which is journaled in a bearing 6 carried by the head 3 and is further rotatably supported in the inner cylinder by a removable head 7. One portion of the inner cylinder is of cylindrical formation and is indicated by the character A and is known as the low pressure end. Another portion of said cylinder is of polygonal shape, as indicated by the character B and is known as the high pressure end. Instead of the cylinder being partly of polygonal shape it may be of any other suitable shape wherein angularly related faces are presented. A portion of the drive shaft 5 within the portion B of the inner cylinder has angularly related faces 8 and mounted thereon are clutch plates 9. The openings in the clutch plates fit the faces of the drive shaft so that the clutch plates will rotate therewith and have axial movement on the drive shaft. Loosely mounted on the drive shaft and arranged between the clutch plates 9 are clutch plates 10, the peripheries of which are shaped to fit the angular walls of the portion B of the inner cylinder so that said clutch plates 10 will be caused to rotate with the inner cylinder and the driven shaft secured thereto. The endwise movements of the clutch plates 9 and 10 are limited on the shaft 5 in one direction by the bearing 6.

The shaft 5 has a bore 5' opening outwardly through the end thereof supported by the bearing 6 to communicate with a chamber 7' of the head 3. The bore 5' of the shaft communicates with the low pressure end of the cylinder by ports 13. A plurality of outlet ports 19 are provided in the shaft 5 at the high pressure end thereof to permit any oil between the disks at that end of the casing to be discharged into the bore 5'.

The inner and outer cylinders being spaced from each other provide a bypass passage 11 connecting with the portion B of the inner cylinder by a plurality of ports 12 and with the chamber 7' of the head 3. The ports 12 are controlled by a slidable valve 14 in the form of a sleeve operating in the space between the inner and outer cylinders and extending exteriorly thereof and has connected thereto an operating medium 15.

A suitable packing 16 is arranged between the head 7 and the drive shaft.

Formed on the drive shaft and located in the inner cylinder 1 is a spiral compressing element or propeller 17 which has wiping contact with the inner walls of the cylindrical portion of the inner cylinder. The propeller divides the high and low pressure ends of the cylinder 1. The purpose of the propeller 17 is to build up pressure which acts on the clutch plates to force the clutch plates 9 and 10 into engagement with each other. It is to be understood that the inner cylinder and bypass passage 11 are completely filled with a liquid.

In operation, to declutch the drive and driven shafts the valve 14 is positioned to uncover the ports 12. The liquid acted on by the propeller then passes through the ports 12 to the bypass passage 11 and returns to the low pressure end of the cylinder by way of the chamber 7' and the bore 5' of the shaft 5 breaking the drive between the drive and driven shafts. The valve in the described position allows the drive shaft to rotate free of the driven shaft. However, when it is desired to clutch the drive and driven shafts, the ports 12 are closed by the valve 14. The pressure of liquid developed by the propeller 17 acts to force the clutch plates 9 and 10 into frictional engagement thereby establishing a drive between the drive and driven shafts. As the propeller agitates the liquid in the low pressure end of the cylinder to create a pressure on the clutch plates, a reduction of pressure will be evidenced in the inner cylinder rearwardly of the propeller and about the ports 13. The increased pressure on the clutch plates and the reduced pressure about the ports 13 will permit the plates to discharge any liquid therebetween through the ports 19 and into the bore 5' and to permit a frictional engagement to be effected between the said plates. The amount of slippage or difference in speed of rotation between the drive and driven shafts can be varied by the position of the valve 14 with respect to the ports 12.

What is claimed is:

1. A device comprising a rotatable cylinder including a cylindrical portion and a portion having angularly related faces, a drive shaft journaled in said cylinder, a driven shaft rotatable with said cylinder, clutch plates mounted on said drive shaft and certain of said clutch plates being free of the drive shaft and having faces to match the angularly related faces of said cylinder and the other clutch plates being fixed on the drive shaft for rotation therewith, means attached to said drive shaft and frictionally engageable with the cylindrical portion of the said cylinder for creating fluid pressure on said clutch plates, and means for controlling the fluid pressure on said clutch plates.

2. A device of the character described comprising a cylinder including a cylindrical portion and a portion having angularly related faces, a drive shaft journaled in said cylinder, a driven shaft fixed on said cylinder, clutch plates mounted on said drive shaft and certain of said clutch plates being free of the drive shaft and having faces to match the angularly related faces of said cylinder and the other clutch plates being fixed on the drive shaft for rotation therewith, a spiral propeller secured on said drive shaft and having wiping contact with the cylindrical portion of the cylinder for developing fluid pressure on said plates during the rotation of the drive shaft, and means for controlling the fluid pressure on said clutch plates.

3. A device of the character set forth comprising a cylinder including a cylindrical portion and a portion having angularly related faces, a drive shaft journaled in said cylinder, a driven shaft fixed on said cylinder, clutch plates mounted on said drive shaft and certain of said clutch plates being free of the drive shaft and having faces to match the angularly related faces of said cylinder and the other clutch plates being fixed on the drive shaft for rotation therewith, a spiral propeller secured on said drive shaft and having wiping contact with the cylindrical portion of the cylinder for developing fluid pressure on said plates, said cylinder having a bypass passage communicating with the interior of the cylinder at opposite ends of the spiral propeller, and a valve means for controlling said bypass passage.

4. A device of the character set forth comprising inner and outer cylinders spaced from each other, a head integrally connecting said cylinders and forming a closure for one end of each cylinder and a chamber, a driven shaft fixed on said head, a second head closing the other end of the inner cylinder, a bearing in said first head, a drive shaft rotatably supported in the inner cylinder by said bearing and the second-named head, clutch plates slidably mounted on and fixed for rotation with said drive shaft, clutch plates arranged between the first-named clutch plates and free of the drive shaft and fixed for rotation with the inner cylinder and slidable relative thereto, a spiral propeller driven by said drive shaft for creating fluid pressure against said clutch plates, said inner and outer cylinders being spaced provides a valve chamber and a bypass passage, said bypass passage being in communication with the interior of the inner cylinder at opposite ends of the propeller, a sleeve valve operable in the valve space for controlling the bypass, and an operating means connected to said sleeve valve.

5. A device comprising in combination a rotatable cylinder, a drive shaft rotatably journalled in said cylinder, a driven shaft fixed to said cylinder, clutch plates rotatable with said drive shaft and axially slidable thereon, clutch plates rotatable with the cylinder and alternately positioned with respect to the said first-mentioned clutch plates, and a spiral propeller formed on said drive shaft and having wiping contact with the inner wall of the said cylinder for developing fluid pressure on the said plates.

6. A device comprising in combination a rotatable cylinder, a drive shaft rotatably journaled in said cylinder, a driven shaft fixed to said cylinder, clutch plates rotatable with said drive shaft and axially slidable thereon, clutch plates rotatable with the cylinder and alternately positioned with respect to the said first-mentioned clutch plates, a spiral propeller formed on said drive shaft and having wiping contact with the inner wall of the said cylinder for developing fluid pressure on the said plates, and means for controlling the fluid pressure on said clutch plates.

7. A device comprising in combination a rotatable cylinder, a drive shaft rotatably journalled in said cylinder, a driven shaft fixed to said cylinder, clutch plates rotatable with said drive shaft and axially slidable thereon, clutch plates rotatable with the cylinder and alternately positioned with respect to said first-mentioned clutch plates, and a spiral propeller formed on the said drive shaft for developing fluid pressure on the said plates.

8. A device comprising in combination a rotatable cylinder, a drive shaft rotatably journalled in said cylinder, a driven shaft fixed to said cylinder, clutch plates rotatable with said drive shaft and axially slidable thereon, clutch plates rotatable with the cylinder and alternately positioned with respect to said first-mentioned clutch plates, a spiral propeller formed on the said drive shaft for developing fluid pressure on said plates, and means for controlling the fluid pressure on said plates.

9. A device comprising a rotatable cylinder including a cylindrical portion and a portion having angularly related faces, a drive shaft journalled in said cylinder, a driven shaft rotatable with said cylinder, clutch plates mounted on said drive shaft and certain of said clutch plates being free of the drive shaft and having faces to match the angularly related faces of said cylinder and other clutch plates being fixed on the drive shaft for rotation therewith, a spiral propeller secured on said drive shaft and having wiping contact with the cylindrical portion of the cylinder for developing fluid pressure on said plates during the rotation of the drive shaft, and means for controlling the fluid pressure on said clutch plates.

10. A device comprising a rotatable cylinder including a cylindrical portion and a portion having angularly related faces, a drive shaft journalled in said cylinder, a driven shaft rotatable with said cylinder, clutch plates mounted on said drive shaft and certain of said clutch plates being free of the drive shaft and having faces to match the angularly related faces of said cylinder and other clutch plates being fixed on the drive shaft for rotation therewith, and means attached to said drive shaft and frictionally engageable with the cylindrical portion of the said cylinder.

11. A device comprising a rotatable cylinder, a drive shaft journalled in said cylinder, a driven shaft rotatable with said cylinder, clutch plates mounted on said drive shaft and certain of said clutch plates being free of the drive shaft and other clutch plates being fixed on the drive shaft for rotation therewith, and a spiral propeller secured on said drive shaft and having wiping contact with the cylinder for developing fluid pressure on said plates during the rotation of said drive shaft.

12. A device comprising a rotatable cylinder, a drive shaft journalled in said cylinder, a driven shaft rotatable with said cylinder, clutch plates mounted on said drive shaft and certain of said clutch plates being free of the drive shaft and other clutch plates being fixed on the drive shaft for rotation therewith, a spiral propeller secured on said drive shaft and having wiping contact with the cylinder for developing fluid pressure on said plates during the rotation of said drive shaft, and means for controlling the fluid pressure on said clutch plates.

13. A device comprising a rotatable casing, a drive shaft journalled in said casing, a driven shaft rotatable with said casing, clutch plates mounted on said drive shaft and certain of said clutch plates being free of the drive shaft and other clutch plates being fixed on the drive shaft for rotation therewith, and a spiral propeller secured on said drive shaft for developing fluid pressure on said plates.

14. A device comprising a rotatable casing, a drive shaft journalled in said casing, a driven shaft rotatable with said casing, clutch plates mounted on said drive shaft for rotation therewith, a spiral propeller secured on said drive shaft for developing fluid pressure on said plates, and means for controlling the fluid pressure on said clutch plates.

EUGENE C. HILL.